(12) United States Patent
Lu

(10) Patent No.: US 9,266,284 B2
(45) Date of Patent: Feb. 23, 2016

(54) FOAM AFFIXING MECHANISM AND CLAMPING ASSEMBLY THEREOF

(71) Applicant: HON HAI PRECISION INDUSTRY CO., LTD., New Taipei (TW)

(72) Inventor: Jian-Qiang Lu, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 279 days.

(21) Appl. No.: 13/901,702

(22) Filed: May 24, 2013

(65) Prior Publication Data

US 2014/0060746 A1 Mar. 6, 2014

(30) Foreign Application Priority Data

Aug. 31, 2012 (CN) .......................... 2012 1 0317593

(51) Int. Cl.
| | |
|---|---|
| *B29C 65/78* | (2006.01) |
| *B25J 15/00* | (2006.01) |
| *B29C 65/00* | (2006.01) |
| *B25J 15/02* | (2006.01) |

(52) U.S. Cl.
CPC ......... *B29C 65/7841* (2013.01); *B25J 15/0028* (2013.01); *B25J 15/0052* (2013.01); *B25J 15/022* (2013.01); *B29C 66/727* (2013.01); *B29C 66/863* (2013.01); *Y10S 901/39* (2013.01); *Y10T 156/17* (2015.01)

(58) Field of Classification Search
CPC ... Y10T 156/17; B23Q 7/043; B25J 15/0028; B25J 15/0206; B25J 15/022; B25J 15/0052; B29C 65/7841; B29C 66/727; B29C 66/66863

USPC .......................... 156/538; 294/106, 115, 198
See application file for complete search history.

(56) References Cited

U.S. PATENT DOCUMENTS

| | | | | |
|---|---|---|---|---|
| 2,279,573 | A | * | 4/1942 | Lang .......................... 198/459.1 |
| 3,945,676 | A | * | 3/1976 | Asamoto ....................... 294/202 |
| 4,728,137 | A | * | 3/1988 | Hamed et al. ................. 294/202 |
| 5,152,568 | A | * | 10/1992 | Blatt .............................. 294/202 |
| 6,361,095 | B1 | * | 3/2002 | Attee .......................... 294/119.1 |
| 2011/0100146 | A1 | * | 5/2011 | Feng .......................... 74/490.03 |

FOREIGN PATENT DOCUMENTS

| | | | |
|---|---|---|---|
| CN | 202833487 U | 3/2013 | |
| JP | 2012-000724 | * 1/2012 | ............... B25J 15/08 |

* cited by examiner

*Primary Examiner* — Philip Tucker
*Assistant Examiner* — John Blades
(74) *Attorney, Agent, or Firm* — Novak Druce Connolly Bove + Quigg LLP

(57) ABSTRACT

A foam affixing mechanism employed to affix foam to a workpiece, includes a robot arm, a foam supplying assembly and a clamping assembly. The foam supplying assembly is located adjacent to the robot arm to supply foam pieces. The clamping assembly is mounted on the robot arm. The clamping assembly includes a fixing frame, a driving member, a pair of fixing members, and a pair of clamping subassemblies. The driving member is mounted on the fixing frame, the pair of fixing members are fixed to the fixing frame. The clamping subassembly includes a first linking member rotatably connected to the driving member and a second linking member rotatably connected to the first linking member. The second linking member is rotatably connected to the fixing member by a middle portion thereof, the second linking member includes a clamping portion at an end. The present invention further discloses a clamping assembly.

19 Claims, 5 Drawing Sheets

FOAM AFFIXING MECHANISM AND CLAMPING ASSEMBLY THEREOF

BACKGROUND

1. Technical Field

The present disclosure relates to an adhering mechanism, and more particularly, to a foam adhering or affixing mechanism and a clamping assembly thereof.

2. Description of Related Art

Various kinds of foam may be adhered or affixed to a workpiece to protect the workpiece from damage caused by static electricity or corrosion. In a regular foam adhesion or affixing process, a number of operators are employed to adhere the foam in the form of one or more foam pieces. The foam adhering or affixing process is labor-consuming and time-consuming. Furthermore, the operators may contaminate the foam pieces, which leads to lower quality. Therefore, a vacuum absorbing mechanism is occupied to adhere the foam automatically. However, certain types of foams have many holes defined therein, thereby making it difficult to have the foam piece be adhered by the vacuum absorbing mechanism, and also reducing the adhesion of the foam piece to the workpiece.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
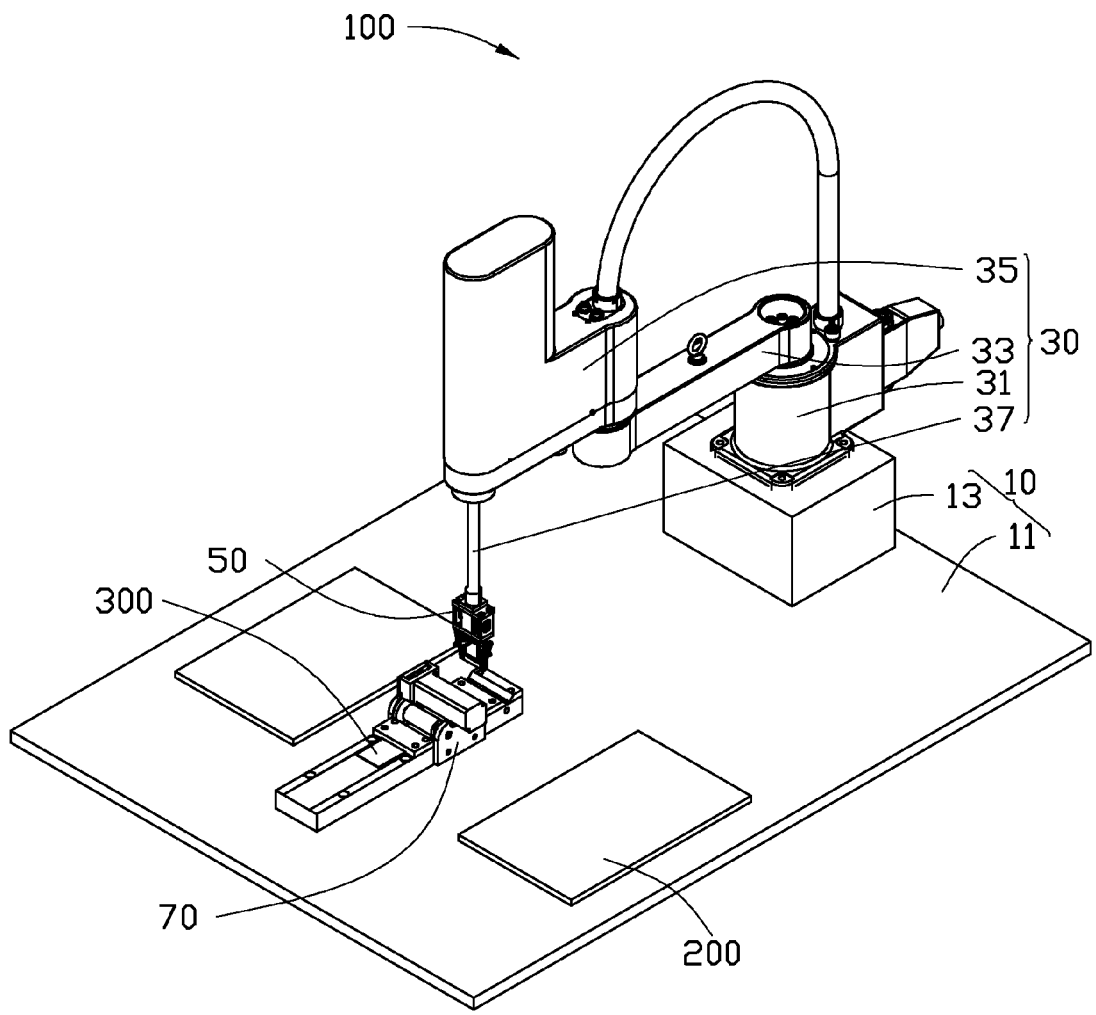
FIG. 1 is an isometric view of an embodiment of a foam affixing mechanism including a clamping assembly and a foam supplying assembly.

FIG. 1 is an embodiment of a foam affixing mechanism 100. The foam affixing mechanism 100 is employed to automatically affix or bond a foam piece 300 to a workpiece 200. The foam affixing mechanism 100 includes a supporting assembly 10, a robot arm 30, a clamping assembly 50 and a foam supplying assembly 70. The robot arm 30 and the foam supplying assembly 70 are mounted on opposite sides of the supporting assembly 10. The clamping assembly 50 is mounted on the robot arm 30, and driven by the robot arm 30 to fetch the foam piece 300 from the foam supplying assembly 70, and then sticks or affixes the foam piece 300 to the workpiece 200.

The supporting assembly 10 includes a supporting plate 11 and a fixing seat 13 fixed on the supporting plate 11 at a side of the supporting assembly 10. The supporting plate 11 is used to support the workpiece 200 and the foam supplying assembly 70.

The robot arm 30 is assembled to the fixing seat 13. The robot arm 30 includes a base seat 31, a first arm 33, a second arm 35 and a third arm 37. The base seat 31 is fixedly mounted on the fixing seat 13. The base seat 31, the first arm 33, and the second arm 35 are rotatably connected to one another in that order. The third arm 37 is in a rod shape, and is fixed to the second arm 35. The third arm 37 is configured substantially perpendicular to the supporting plate 11.

Figure 2:
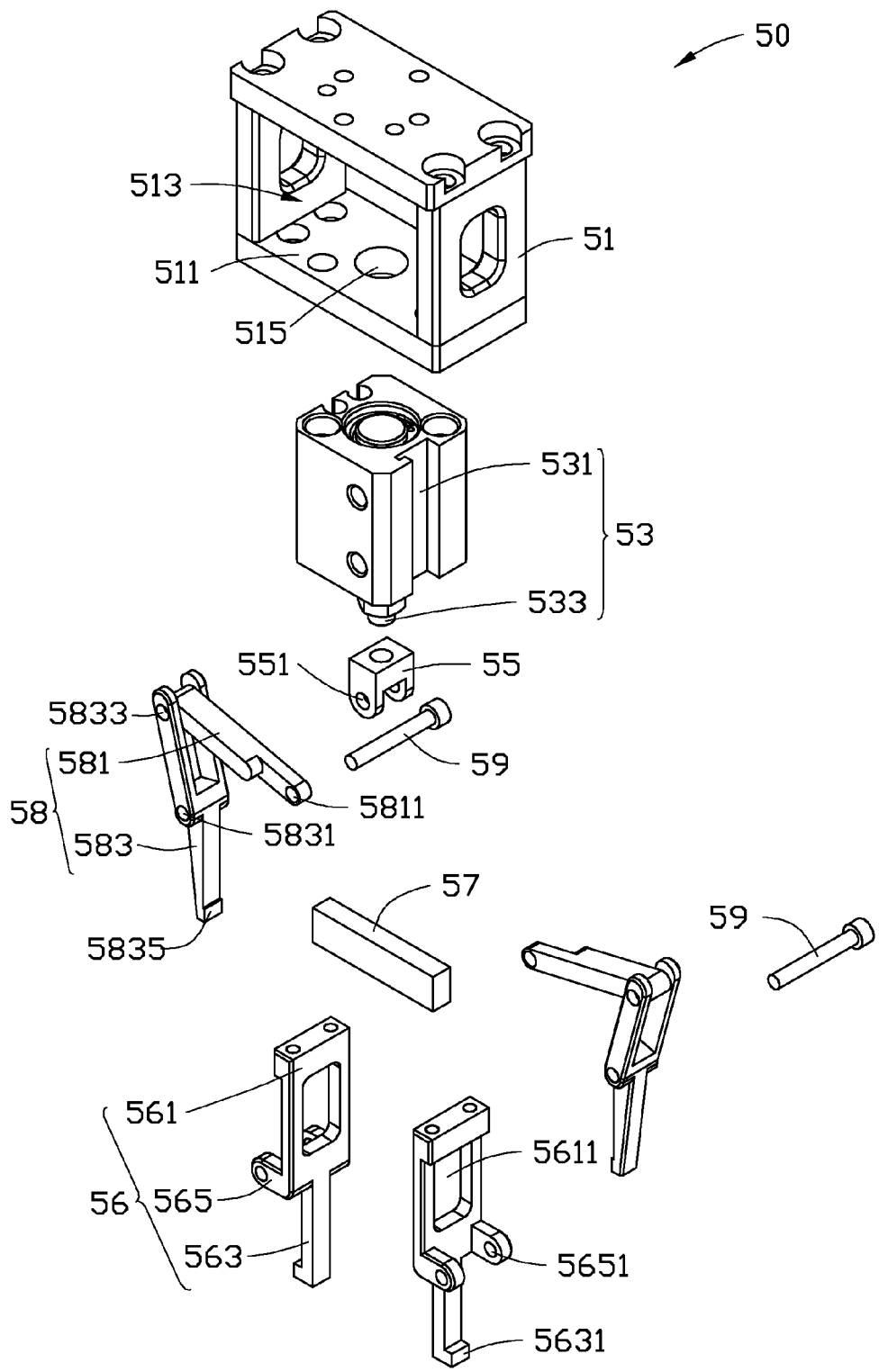
FIG. 2 is an enlarged, exploded, isometric view of the clamping assembly of FIG. 1.
Figure 3:
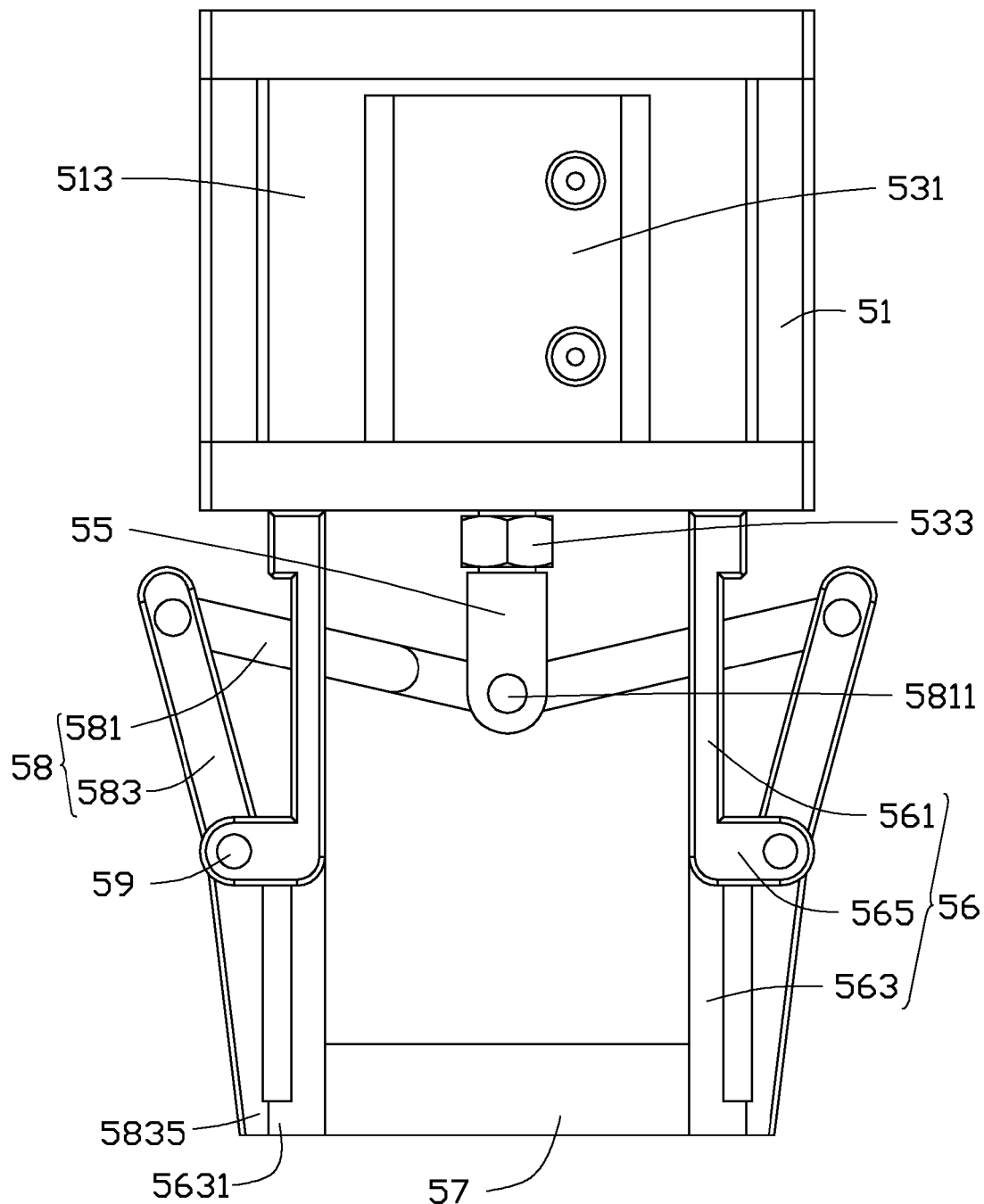
FIG. 3 is a side view of the clamping assembly of FIG. 2.

FIGS. 2 and 3 show that the clamping assembly 50 includes a fixing frame 51, a driving member 53, a connecting member 55, a pair of fixing members 56, a resisting member 57, a pair of clamping subassemblies 58 and a pair of pivotal members 59. The fixing frame 51 is mounted on a distal end of the third arm 37 away from the second arm 35. The fixing frame 51 is substantially cubic shape and includes four fixing plates 511 forming a receiving chamber 513. One of the four fixing plates 511 away from the third arm 37 defines a through hole 515. The driving member 53 includes a main body 531 and a driving shaft 533 connected to the main body 531. The main body 531 is received in the receiving chamber 513 and fixed to the fixing plate 511 that is away from third arm 37. The driving shaft 533 is slidably received in the through hole 515 of the fixing plate 511.

The connecting member 55 is substantially U shape, and a bottom of the U shape of the connecting member 55 is fixed to the driving shaft 533. Opposite ends of the U shaped connecting member 55 each defines a first pivotal hole 551.

The pair of fixing members 56 are substantially perpendicularly fixed to opposite ends of a side of the one fixing plate 511 away from the third arm 37. The pair of fixing members 56 is located at opposite sides of the driving shaft 533. The fixing member 56 includes a base body 561, a connecting portion 563 and a pair of extending portions 565. The base body 561 is fixed to the fixing plate 511 and defines an extending hole 5611. The connecting portion 563 is substantially a rod shape, and extends from an end of the base body 561 away from the fixing frame 51. The connecting portion 563 includes a resisting end 5631 extending away from a distal end thereof away from the connecting portion 563 of the other fixing member 56. The pair of extending portions 565 is substantially perpendicularly to the base body 561 and extends from an end of the base body 561 adjacent to the connecting portion 563. Each of the pair of extending portions 565 defines a second pivotal hole 5651. A communication line of the pair of second pivotal holes 5651 is substantially parallel to a communication line of the pair of first pivotal holes 551. The resisting member 57 is located at the ends of the pair of connection portions 563 away from the fixing frame 51. Opposite ends of the resisting member 57 are fixedly connected to the pair of fixing members 56.

The clamping subassembly 58 includes a first linking member 581 and a second linking member 583 rotatably connected to the first linking member 581. The first linking member 581 is rotatably connected to the connecting member 55 and extends through the extending hole 5611 of the fixing member 56. The second linking member 583 is rotatably connected to the fixing member 56 by a middle portion thereof.

The first linking member 581 includes a first pivotal portion 5811 at an end rotatably connected to the first pivotal hole 551 of the connecting member 55. An end of the first linking member 581 opposite to the first pivotal portion 5811 is rotatably connected to the second linking member 583. The second linking member 583 is substantially a bent rod, and defines a third pivotal hole 5831 at a middle portion thereof corresponding to the second pivotal hole 5651 of the extending portion 565. The pair of pivotal members 59 respectively extends through the pair of third pivotal holes 5831 and the pair of second pivotal holes 5651 to rotatably connect the second linking member 583 with the extending portion 565 of the fixing member 56. The second linking member 583 includes a second pivotal portion 5833 and a clamping portion 5835 at opposite ends thereof. The second pivotal portion 5833 is rotatably connected to the first linking member 581. The clamping portion 5835 and the resisting end 5631 of the fixing member 56 are employed to cooperatively clamp the foam pieces 300. The second linking member 583 may be in other shapes, such as a straight rod.

Figure 4:
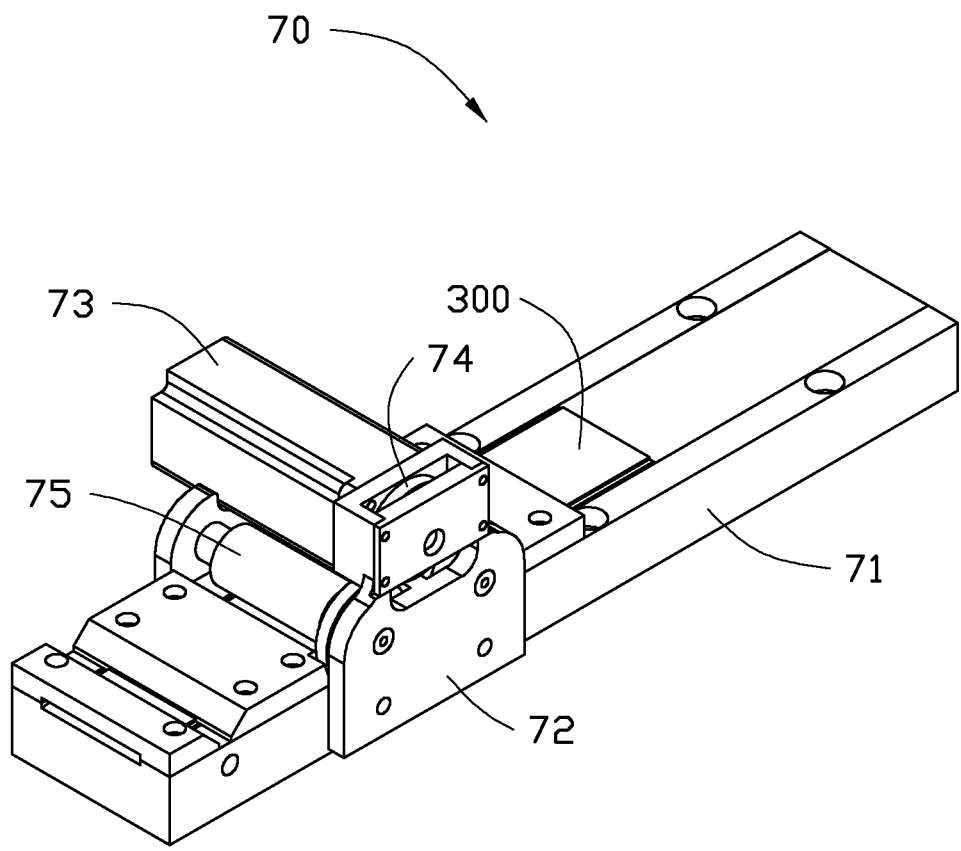
FIG. 4 is an isometric view of the foam supplying assembly of FIG. 1.
Figure 5:
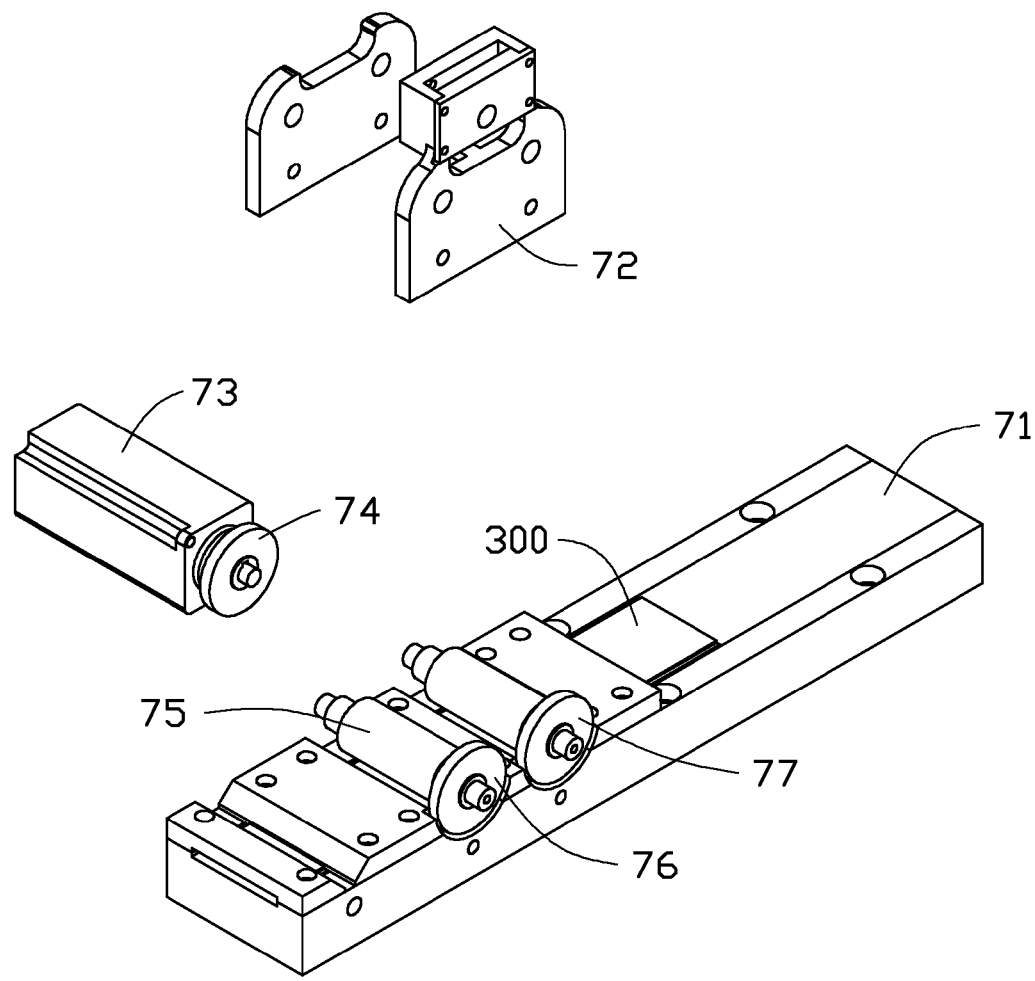
FIG. 5 is an exploded, isometric view of the foam supplying assembly of FIG. 4.

FIGS. 4 and 5 show that the foam supplying assembly 70 includes a supporting member 71, a fixing bracket 72, a driving member 73, a first pulley 74, a pair of transmission members 75, a second pulley 76 and a third pulley 77. The supporting member 71 is mounted on the supporting plate 11 for supporting the foam piece 300. The fixing bracket 72 is mounted on the supporting member 71. The driving member 73 is mounted on the fixing bracket 72 and located above the fixing bracket 72. The first pulley 74 is assembled to an end of the driving member 73. The transmission member 75 is substantially in a cylindrical shape, and opposite ends of the transmission member 75 is connected to the fixing bracket 72. The pair of transmission members 75 is arranged parallel to each other below the driving member 73. A gap is generated between the pair of transmission members 75 and the supporting member 71 for the foam piece 300 to extend therethrough. The second pulley 76 and the third pulley 77 are respectively fixed to the pair of transmission members 75 engaging with the first pulley 74. The second pulley 76 and the third pulley 77 are driven by the first pulley 74 to rotate, thereby rotating the pair of transmission members 75. The foam piece 300 is located between the pair of transmission members 75 and the supporting member 71, and can be driven by the pair of transmission members 75 to slide along the supporting member 71.

When in assembly, the base seat 31 of the robot arm 30 is assembled to the fixing seat 13. The base seat 31, the first arm 33, and the second arm 35 are rotatably connected to each other in that order. The third arm 37 is fixedly connected to the second arm 35. The main body 531 of the driving member 53 is mounted in the receiving chamber 513, and the driving shaft 533 extends through the through hole 515 of the fixing frame 51. The connecting member 55 is fixed to the driving shaft 533. The pair of fixing members 56 is parallel to each other, and fixed to the fixing frame 51. The resisting member 57 interconnects the pair of fixing members 56 at a distal end away from the fixing frame 51. The first pivotal portions 5811 of the pair of first linking members 581 are pivotally connected to the first pivotal holes 551 of the connecting member 55. The first linking member 581 extends through the extending hole 5611 of the fixing member 56 and rotatably connects to the second linking member 583. The pair of second linking members 583 is rotatably connected to the pair of fixing members 56, respectively.

When in use, the workpiece 200 is located at the supporting plate 11. In the embodiment, a pair of workpieces 200 is placed upon the supporting plate 11. The robot arm 300 rotates towards the foam piece 300, then the third arm 37 moves toward the supporting member 71 till the resisting member 57 resists the foam piece 300. Due to the resistance of the resisting member 57, opposite sides of the foam piece 300 tilt upward, thereby generating a gap between the foam piece 300 and the supporting member 71. The main body 531 of the driving member 53 drives the driving shaft 533 toward the resisting member 57, thereby pushing the first pivotal portions 5811 of the first linking members 581 toward the resisting member 57. The driving shaft 533 rotates the pair of first linking members 581 and drives the second pivotal portions 5833 of the pair of second linking members 583 toward each other, thereby driving the pair of clamping portions 5835 of the pair of second linking members 583 move away from the corresponding resisting end 5631 of the fixing member 56.

Opposite sides of the foam piece 300 are received between the clamping portions 5835 and the resisting ends 5631. When the main body 531 drags the driving shaft 533 away from the resisting member 57, the pair of first linking members 581 drive the pair of second linking members 583 to rotate. The pair of clamping portions 5835 move toward the pair of the resisting ends 5631, respectively, and then extend into the gaps of opposite sides of the foam piece 300, thereby clamping the foam piece 300. The robot arm 30 moves the foam piece 300 toward the workpiece 200 and affixes the foam piece 300 on the workpiece 200. When the clamping assembly 50 is in operating mode, the driving member 73 drives the pair of transmission members 75 to rotate via the first pulley 74, the second pulley 76, and the third pulley 77. The pair of transmission members 75 resist the foam pieces 300 and drives the foam pieces 300 to slide along the supporting member 71.

The connecting member 55 may be omitted, when the pair of clamping subassemblies 58 are directly connected to the driving shaft 533. When the pair of fixing members 56 is employed to resist the foam piece 300 to tilt upward, the resisting member 57 may be omitted. The number of the transmission members 75 may be one, two or more when in need. When the driving member 73 is arranged at a side of the supporting member 71, and directly drives the pair of transmission members 75 to rotate, the fixing bracket 72 may be omitted.

Due to the robot arm 30 in the foam affixing mechanism 100, a high efficiency of adhesion can be obtained, and the foam pieces 300 can be prevented from being contaminated. The reposition precision of the resisting member 57 is maximized. The foam piece 300 is tilted upward by the resisting member 57, and is clamped by opposite sides thereof, thus the foam affixing mechanism 100 is favorable to clamp various kinds of foam pieces 300.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A foam affixing mechanism employed to adhere a foam piece to a workpiece, comprising:
   a robot arm;
   a foam supplying assembly located adjacent to the robot arm to supply the foam piece; and
   a clamping assembly mounted on the robot arm, the clamping assembly comprising:
      a fixing frame;
      a driving member mounted on the fixing frame;
      a pair of fixing members fixed to the fixing frame and located at opposite sides of the driving member; and
      a pair of clamping subassemblies, each clamping subassembly comprising:
         a first linking member rotatably connected to the driving member, and
         a second linking member, wherein a first end of the second linking member is rotatably connected to the first linking member, a middle portion of the second linking member is rotatably connected to the fixing member, a clamping portion is formed at a second end of the second linking member away from the first linking member;

when the driving member drives the first linking members to rotate the second linking members in a first direction, each clamping portion moves toward the corresponding fixing member, thus each clamping portion and the corresponding one of the fixing members cooperatively clamp opposite sides of the foam piece;

when the driving member drives the first linking members to rotate the second linking members in a second direction reverse to the first direction, the clamping portions move away from the fixing members to release the foam piece clamped by one clamping portion and the corresponding one fixing member.

2. The foam affixing mechanism of claim 1, wherein the driving member comprises a main body fixedly received in the fixing frame, and a driving shaft connected to the main body and extending through the fixing frame; the first linking members are rotatably connected to the driving shaft.

3. The foam affixing mechanism of claim 2, wherein the clamping assembly further comprises a U shaped connecting member, a first end of the U shaped connecting member is fixed to the driving shaft, each of opposite sides of a second end of the U shaped connecting member defines a first pivotal hole therein; each first linking member comprises a first pivotal portion formed at an end of the first linking member away from the corresponding second linking member, each first pivotal portion is rotatably connected to the U shaped connecting member via the pair of first pivotal holes.

4. The foam affixing mechanism of claim 3, wherein the second linking member comprises a second pivotal portion positioned opposite to the clamping portion, the second pivotal portion is rotatably connected to the first linking member.

5. The foam affixing mechanism of claim 4, wherein the pair of fixing members are arranged at opposite sides of the driving shaft, each fixing member comprises a resisting end formed at a distal end of the corresponding fixing member away from the fixing frame; each resisting end and the corresponding clamping portion of the second linking member cooperatively clamp the foam piece.

6. The foam affixing mechanism of claim 1, wherein each fixing member comprises a base body fixed to the fixing frame and defining an extending hole therein, and a connecting portion extending from an end of the base body away from the fixing frame; the first linking member extends through the extending hole.

7. The foam affixing mechanism of claim 6, wherein each fixing member further comprises a pair of extending portions extending from an end of the base body adjacent to the connecting portion, the middle portion of the second linking member is rotatably connected to the pair of extending portions.

8. The foam affixing mechanism of claim 7, wherein each of the pair of extending portions defines a pivotal hole therein, each second linking member defines a pivotal hole at the middle portion thereof; the clamping assembly further comprises a pair of pivotal members, each pivotal member extends through the pair of pivotal holes of the pair of extending portions and the pivotal hole of the corresponding second linking member to rotatably connect the second linking member with the fixing member.

9. The foam affixing mechanism of claim 1, wherein the clamping assembly further comprises a resisting member located at ends of the pair of fixing members away from the fixing frame, opposite ends of the resisting member are fixedly connected to the pair of fixing members; the resisting member resists the foam piece to tilt upward at opposite sides, thereby generating a gap below each side of the foam piece for the clamping portion extending therethrough.

10. The foam affixing mechanism of claim 1, wherein the foam supplying assembly further comprises a supporting member, a fixing bracket mounted on the supporting member, a driving member mounted on the fixing bracket, and a pair of transmission members; opposite ends of each transmission member is connected to the fixing bracket, a gap is generated between the pair of transmission members and the supporting member for the foam piece extending therethrough; the driving member is configured to drive the pair of transmission members to rotate, thereby moving the foam piece relative to the supporting member.

11. The foam affixing mechanism of claim 10, wherein the pair of transmission members are arranged parallel to each other and below the driving member the foam supplying assembly further comprises a first pulley fixed to the driving member, and a second pulley and a third pulley respectively fixed to the pair of transmission members and driven by the first pulley to rotate.

12. A clamping assembly employed to clamp a foam piece, comprising:
a fixing frame;
a driving member mounted on the fixing frame;
a pair of fixing members fixed to the fixing frame and located at opposite sides of the driving member; and
a pair of clamping subassemblies, each clamping subassembly comprising:
a first linking member rotatably connected to the driving member, and
a second linking member, wherein a first end of the second linking member is rotatably connected to the first linking member, a middle portion of the second linking member is rotatably connected to the fixing member, a clamping portion is formed at a second end of the second linking member away from the first linking member;
when the driving member drives the first linking members to rotate the second linking members in a first direction, each clamping portion moves toward the corresponding fixing member, thus each clamping portion and the corresponding fixing member cooperatively clamp opposite sides of the foam piece;
when the driving member drives the first linking members to rotate the second linking members in a second direction reverse to the first direction, the clamping portions move away from the fixing members to release the foam piece clamped by one clamping portion and the corresponding one fixing member.

13. The clamping assembly of claim 12, wherein the driving member comprises a main body fixedly received in the fixing frame, and a driving shaft connected to the main body and extending through the fixing frame; the first linking members are rotatably connected to the driving shaft.

14. The clamping assembly of claim 13, further comprising a U shaped connecting member, wherein a bottom of the U shaped connecting member is fixed to the driving shaft, each of opposite sides of the U shaped connecting member defines a first pivotal hole therein each first linking member comprises a first pivotal portion formed at an end of the first linking member away from the corresponding second linking member, each first pivotal portion is rotatably connected to the U shaped connecting member via the pair of first pivotal holes.

15. The clamping assembly of claim 14, wherein the second linking member further comprises a second pivotal portion positioned opposite to the clamping portion and rotatably connected to the first linking member, the pair of fixing members are arranged at opposite sides of the driving shaft, each fixing member comprises a resisting end formed at a distal end of the corresponding fixing member away from the fixing frame; each resisting end and the corresponding clamping portion of the second linking member cooperatively clamp the foam piece.

16. The clamping assembly of claim 12, wherein each fixing member comprises a base body fixed to the fixing frame and defining an extending hole therein, and a connecting portion extending from an end of the base body away from the fixing frame; the first linking member extends through the extending hole.

17. The clamping assembly of claim 16, wherein each fixing member further comprises a pair of extending portions extending from an end of the base body and adjacent to the connecting portion, the middle portion of the second linking member is rotatably connected to the pair of extending portions.

18. The clamping assembly of claim 17, wherein each of the pair of extending portions defines a pivotal hole therein, each second linking member defines a pivotal hole at the middle portion thereof; the clamping assembly further comprises a pair of pivotal members, each pivotal member extends through the pair of pivotal holes of the pair of extending portions and the pivotal hole of the corresponding second linking member to rotatably connect the second linking member with the fixing member.

19. The clamping assembly of claim 18, wherein the clamping assembly further comprises a resisting member located at ends of the pair of connecting portions of the pair fixing members away from the fixing frame, opposite ends of the resisting member are fixedly connected to the pair of fixing members; the resisting member resists the foam piece to tilt upward at opposite sides, thereby generating a gap below each side of the foam piece, for the clamping portion extending therethrough.

* * * * *